United States Patent

[11] 3,629,801

[72] Inventor Erwin C. Brede
Metairie, La.
[21] Appl. No. 853,645
[22] Filed Aug. 28, 1969
[45] Patented Dec. 21, 1971
[73] Assignee Texas Instruments Incorporated
Dallas, Tex.

[54] SEISMIC EXPLORATION IN THE VICINITY OF A SHORE AREA
18 Claims, 6 Drawing Figs.
[52] U.S. Cl. .................................................... 340/15.5
[51] Int. Cl. ...................................................... G01v 1/16, G01v 1/28
[50] Field of Search ......................................... 340/15.5 MC, 15.5 CC, 15.5 CD, 7 R, 7; 181/.5

[56] References Cited
UNITED STATES PATENTS
3,281,768  10/1966  Pavey, Jr. et al. ............. 340/7
3,290,645  12/1966  Pavey, Jr. et al. ............. 340/7
3,332,057   7/1967  Pavey, Jr. ...................... 340/17
3,346,838  10/1967  Johnson et al. ................ 340/7
3,416,629  12/1968  Brede ............................ 181/.5

Primary Examiner—Rodney D. Bennett, Jr.
Assistant Examiner—N. Moskowitz
Attorneys—James O. Dixon, Andrew M. Hassell, Harold Levine, Melvin Sharp and Rene E. Grossman ABSTRACT: First electrical signals are generated in response to detection in shallow water adjacent a shore area of variations in pressure created by the generation of seismic waves. Second electrical signals are generated at the shore area in response to particle velocity variations created by the seismic waves. The first and second electrical signals are recorded and then phase shifted with respect to one another according to a predetermined optimum time shift function determined by cross-correlation of test signals.

INVENTOR
ERWIN C. BREDE

INVENTOR
ERWIN C. BREDE

INVENTOR
ERWIN C. BREDE

SEISMIC EXPLORATION IN THE VICINITY OF A SHORE AREA

This invention relates to seismic exploration, and more particularly to seismic exploration of shore areas wherein both pressure sensitive and velocity sensitive detectors are utilized.

Seismic exploration has long been conducted in many areas of the world by generating seismic impulses and by detecting reflections and refractions of the seismic waves by velocity sensitive geophones on land, and by pressure sensitive geophones in water. However, it has not heretofore been practical to obtain meaningful seismic data in the vicinity of many shore areas or in water-marsh areas. For instance, the random noise created by the surf in such areas has tended to be so high as to override the usable seismic data obtained by conventional seismic prospecting. Further, surf conditions have heretofore placed severe limitations on the times available for seismic exploration, thus substantially increasing the cost and time of working shore areas.

Further, rough surf water has heretofore generally prevented the use of velocity geophones due to the almost impossible geophone planting conditions, while pressure detectors have also been generally unusable in such water due to the relatively low hydrostatic pressure available in shallow water. Even when the velocity geophones are successfully planted in a surf area, the geophones cannot generally be kept in the upright position required for proper functioning due to the severe action of the surf.

Even in relatively calm shore areas or in shore areas comprising a water-marsh interface, successful seismic exploration has not been generally possible due to the requirement of the combined use of pressure sensitive geophones and velocity sensitive geophones. It is established that the output signals generated by such pressure sensitive geophones are phase shifted with respect to output signals generated by velocity sensitive geophones in response to the same reference seismic wave. This problem is further compounded by the fact that the phase shift between the two types of geophones is not constant with respect to frequency. As shallow seismic reflections tend to have a higher fundamental frequency nature than deeper seismic reflections, the outputs from pressure sensitive geophones and velocity sensitive geophones in typical seismic record taking are phase shifted by different amounts with respect to record time. The problem of satisfactorily phase shifting the resulting seismic traces has not heretofore been satisfactorily resolved. There thus exists throughout the world a seismic coverage gap along shores and coasts between water depths of about 50 feet and the shore or marsh line.

In accordance with the present invention, a seismic exploration method and system includes the generation of seismic waves and the detection of variations in pressure created by the generation of the waves at a first array. A second array detects velocity variations created by the seismic waves. The output signals of the first and second arrays are time shifted into alignment according to a predetermined optimum time shift function.

In accordance with another aspect of the invention, first electrical signals are generated in response to pressure variations created by seismic disturbances in water adjacent a shore area. Second electrical signals are generated in response to variations in velocity in the shore area also created by the seismic disturbances. The phases of the first and second electrical signals are shifted relative to one another into phase alignment in response to a predetermined optimum time shift function.

In accordance with a more specific aspect of the invention, an optimum time shift function for aligning the phases of output signals from pressure sensitive and velocity sensitive seismic geophone arrays is determined by generating a seismic wave between a reference pressure geophone and a reference velocity geophone. The outputs from the geophones are cross-correlated for determination of an optimum phase shift function. Filters are then designed in response to the phase shift function in the frequency domain and applied in the time domain to selectively shift the phases of the geophone outputs into alignment.

In accordance with another aspect of the invention, seismic waves are detected in response to pressure vibrations in the water adjacent a shore area by a first array of geophones. The first array of geophones are separated from a second array of velocity responsive geophones by a jumper cable extending through a surf area. The second geophone array detects variations in velocity created by the seismic waves in the shore area to provide complete seismic coverage under the surf area.

For a more complete understanding of the present invention and for further objects and advantages thereof, reference is now made to the following description taken in conjunction with the accompanying drawings, in which.

Figure 1:
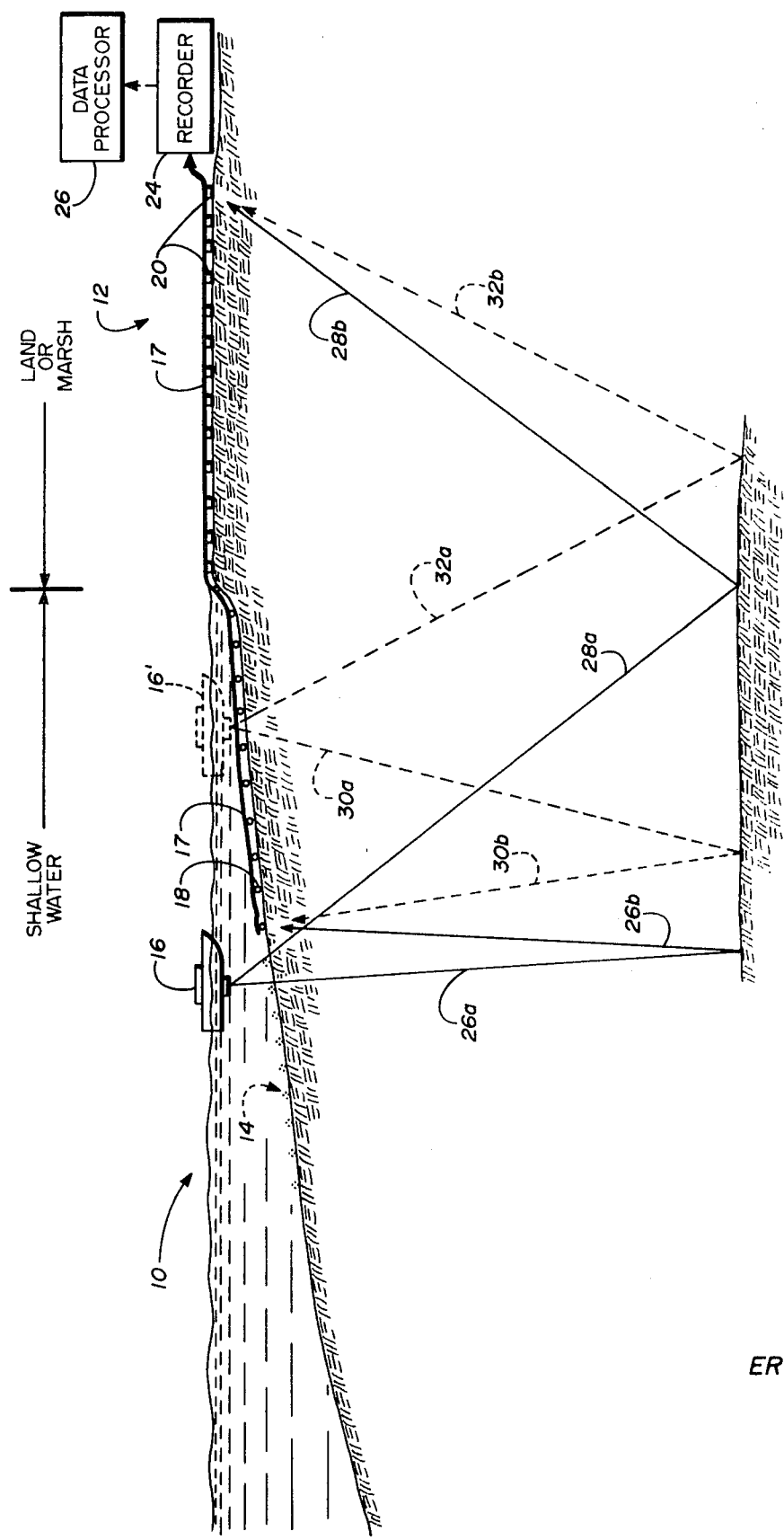
FIG. 1 is a somewhat diagrammatic representation of seismic exploration according to the invention in a shore or marsh area without a heavy surf.

Referring to FIG. 1, one embodiment of the present seismic exploration technique is diagrammatically illustrated. The area desired to be seismically mapped is a shore area, which in this disclosure will be defined as the area extending between shallow water of depths less than 50 feet, as generally designated by the numeral 10, and the low, sometimes marshy shore designated generally by the numeral 12. It is this shore area which has heretofore been extremely difficult to seismically explore for the reasons previously mentioned. The present seismic exploration is initially carried out in the conventional manner in the deeper parts of the water by laying out linear arrays of pressure sensitive seismic receivers or geophones 14 and by generating seismic waves from a marine vessel 16. Refractions and reflections from the generated seismic waves are received by the geophones 14 and recorded. This conventional marine seismic exploration is carried out until the shore area is reached, whereupon a cable 17 is extended from the shallow water 10 adjacent the shore up and onto the shore 12. A first array of pressure sensitive geophones 18 is connected along cable 17 up to the beginning of the shore 12, whereupon a second array of velocity sensitive geophones 20 are connected along the remainder of cable 17.

Exploration according to the invention is facilitated by the use of conventional light bay seismic cable which comprises a flexible plastic coated cable with a plurality of leadins molded at spaced intervals therealong. Each of the leadins has a threaded adapter to which may be attached either a pressure sensitive geophone or a velocity sensitive geophone.

A suitable light bay cable for use with the invention is, for example, the cable manufactured and sold by the Vector Manufacturing Co., of Houston, Texas. While conducting exploration of the deeper water areas away from the shore area, pressure sensitive geophones are threadedly connected to each of the molded leadins of the cable. This exploration is conducted utilizing a conventional "roll-along switch" wherein sequential arrays of pressure sensitive geophones are automatically switched into a recorded in order to facilitate the conduction of the exploration. When the exploration approaches the shore 12, the light bay cable 17 is disposed as shown in FIG. 1 wherein one end portion thereof is in the water adjacent the shore and the other end portion is on the shore or marsh area. In the shore or marsh area, the pressure sensitive geophones are unscrewed from the molded leadins on the cable 17 and velocity sensitive geophones are connected in place thereof.

Any suitable type of pressure sensitive geophone may be used with the invention, as for example the MP-8 geophone manufactured and sold by the Geospace Corporation of Houston, Texas. In this type of pressure sensitive geophone, a rubber diaphragm senses pressure changes and moves a piezoelectric crystal for generation of electrical signals.

The velocity sensitive geophones 20 may comprise any suitable type of geophone responsive to variations in particle velocity to generate electrical signals in response thereto. For instance, the velocity sensitive geophones Model HS-J manufactured and sold by the Geospace Corporation of Houston, Texas, may be advantageously utilized. When seismic exploration is being conducted in a low, marshy area, leads from 20 to 50 feet long are often connected to the velocity sensitive geophones 20 for connection to the cable 17 so that the geophones 20 may be pushed down into the marsh for optimum operation.

Although for the purposes of this disclosure, velocity sensitive geophones have been described in the preferred embodiment, it will be understood that other types of transducers adapted for use on land or in marshy areas could alternatively be utilized. For instance, acceleration sensitive geophones, particle displacement sensitive geophones and the like could alternatively be utilized, and are intended to be encompassed by the term velocity sensitive geophones herein utilized.

Figure 2:
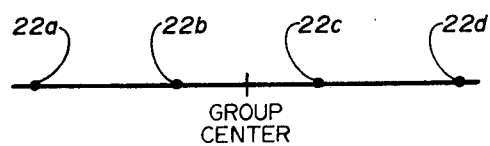
FIG. 2 is a representation of a typical geophone station array for use with the technique shown in FIG. 1.

It will be understood that many different types and sizes of geophone arrays may be utilized in the present invention. HOwever, in the preferred embodiment, 24 geophone groups are connected to the cable 17, with each of the geophone groups including four geophones. A typical geophone group is illustrated in FIG. 2, wherein four geophones 22a–d are symmetrically spaced along the cable 17. A typical spacing between the geophones of such a group would be about 30 feet between each geophone. A typical spacing between individual geophone groups along the cable 17 would be 220 or 330 feet intervals between the group centers of adjacent geophone groups. Of course, this spacing could be varied for use with different applications of the present technique. A typical overall length of the cable 17 would be, for example, about 5,000 to 8,000 feet.

After the cable 17 has been laid out across the shore area as illustrated in FIG. 1, the marine vessel 16 generates a seismic disturbance at an offset position from the first pressure sensitive geophone 18. A typical such in-line offset interval is about 300–600 feet, depending on the length of the cable 17, the spacing between the geophone groups, and desired operating conditions. As is well known, this in-line offset of the shot generation minimizes shot noise and provides a greater shot-to-receiver distance. A suitable type of marine seismic wave generation system may be utilized with the invention, such as conventional air guns, gas explosion chambers, dynamite explosions or the like.

Reflections of the generated seismic waves from underground strata and reflecting surfaces will be received by each of the geophone arrays 18 and 20, with electrical signals being generated thereby and fed via cable 17 into a conventional multirace magnetic recorder 24. For instance, seismic waves traveling the raypath 28ab will be detected by the end velocity sensitive geophone 20. Other reflections of the seismic waves generated by the marine vessel 16 will be received by the remaining geophones connected to the cable.

After generation of seismic waves at the initial offset location shown in FIG. 1, the vessel 16 travels toward the shore for an increment until the vessel is offset from the second pressure sensitive geophone 18. Additional seismic waves or disturbances are then generated and detected. Still other seismic waves are generated at an offset position over each of the pressure sensitive geophones 18 until the vessel reaches the closest possible position adjacent the shore which is diagrammatically indicated by the numeral 16'. Seismic waves generated at position 16' follow the raypath 30a–b for detection by the endmost pressure sensitive geophone 18, and follow the raypath 32a–b for detection by the endmost velocity sensitive geophone 20. Of course, other seismic waves will follow additional raypaths not shown for reception by the remaining geophones connected to the cable 17. After generating seismic impulses at position 16', an additional in-line array of 24 velocity sensitive geophone stations may be laid out and additional seismic disturbances generated at the position 16' to enable further inland coverage of the shore area. Conventional land based seismic exploration may then be conducted further inland.

After completion of the in-line exploration of the shore area as previously described, a plurality of seismic waves will be recorded on recorder 24 in the well-known manner. Multifold coverage will be provided by the subsurface area underlying the seismic cable 17 to enable subsequent processing such as record stacking and the like. This processing is conventionally accomplished by data processor 26. While the processor 26 may comprise any one of a number of different conventional processing stations, in a preferred embodiment of the invention the processor includes the digital field system DFS/10,000, manufactured and sold by Texas Instruments Incorporated, which provides amplification, filtering, multiplexing and digitizing operations upon the recorded seismic date in a well-known manner. This digitized information is then fed into the properly programmed digital computer such as the TIAC manufactured and sold by Texas Instruments Incorporated, for additional digital processing such as stacking, deconvolution and the like.

However, meaningful seismic data is not obtainable after conventional data processing within the processor 26, due to the previously noted phase shifts inherent between the outputs of pressure and velocity sensitive geophones. This problem cannot be solved by introducing a constant phase shift into the records, as the phase shift is dependent upon the fundamental frequency of the recorded seismic waves.

Figure 4A:
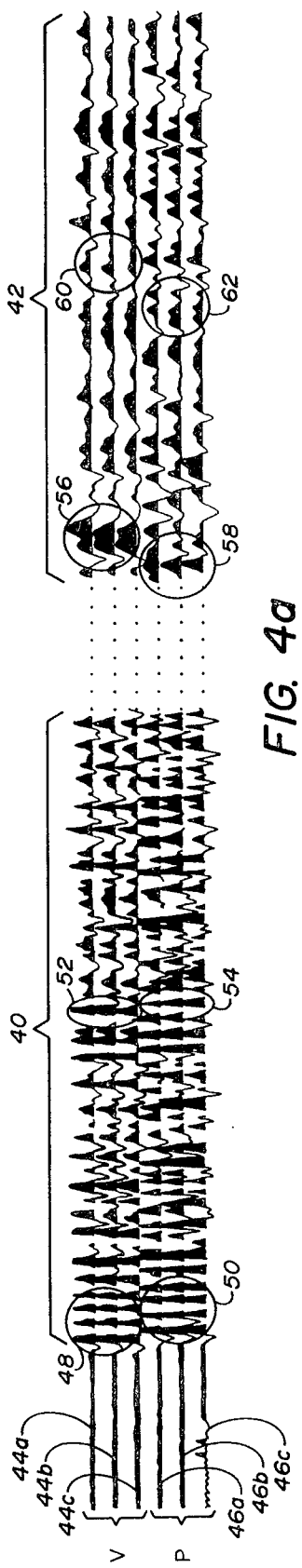
FIG. 4a is a seismogram illustrating traces from velocity and pressure sensitive geophones prior to processing according to the invention.

In order to better understand the relative phase shifts introduced between velocity sensitive and pressure sensitive transducers, reference is made to FIG. 4a. Data shown in FIGS. 4a–b has been digitally processed and then converted through a conventional digital-to-analog converter, such as the converter within the Digital Field System DFS/10,000. The converted data is then displayed in an analog fashion. The section of the record encompassed by bracket 40 comprises processed data received from relatively shallow depths during the initial seconds a signal reception. The portions of the waveforms encompassed by the bracket 42 are processed seismic traces received from the deeper reflection strata from approximately 15,000 feet or more. Traces 44a–c are generated by velocity responsive geophones, while traces 46a–c are generated from pressure sensitive geophones. The data shown in FIG. 4a has been digitally processed by vertical stacking, normal moveout correction, time varient deconvolution and residual normal moveout correction.

However, it will be noticed that traces 44a–c are out of phase with traces 46a–c with respect to common events. This phase shift is clearly illustrated by the time aligned peaks of traces 44a–c denoted at 48, when compared to the time shifted aligned peaks of traces 46a–c denoted by the numeral 54. Additionally, the generally aligned positive peaks in area 56 are substantially time shifted from the corresponding peaks in the area 58. Similarly, the corresponding peaks located in areas 60 and in area 62 are time shifted with respect to one another.

As thus clearly shown in FIG. 4a, portions of the traces 44a–c and 46a–c are out of phase with each other by different intervals dependent upon the fundamental frequencies of the reflected waveforms. As earlier noted, these fundamental frequencies are dependent upon the depth from which the waves are reflected. This phase shift may be seen to vary both in magnitude and from lead to lag, thereby preventing the use of a constant phase shift between the outputs of the velocity and pressure geophones.

Figure 3:
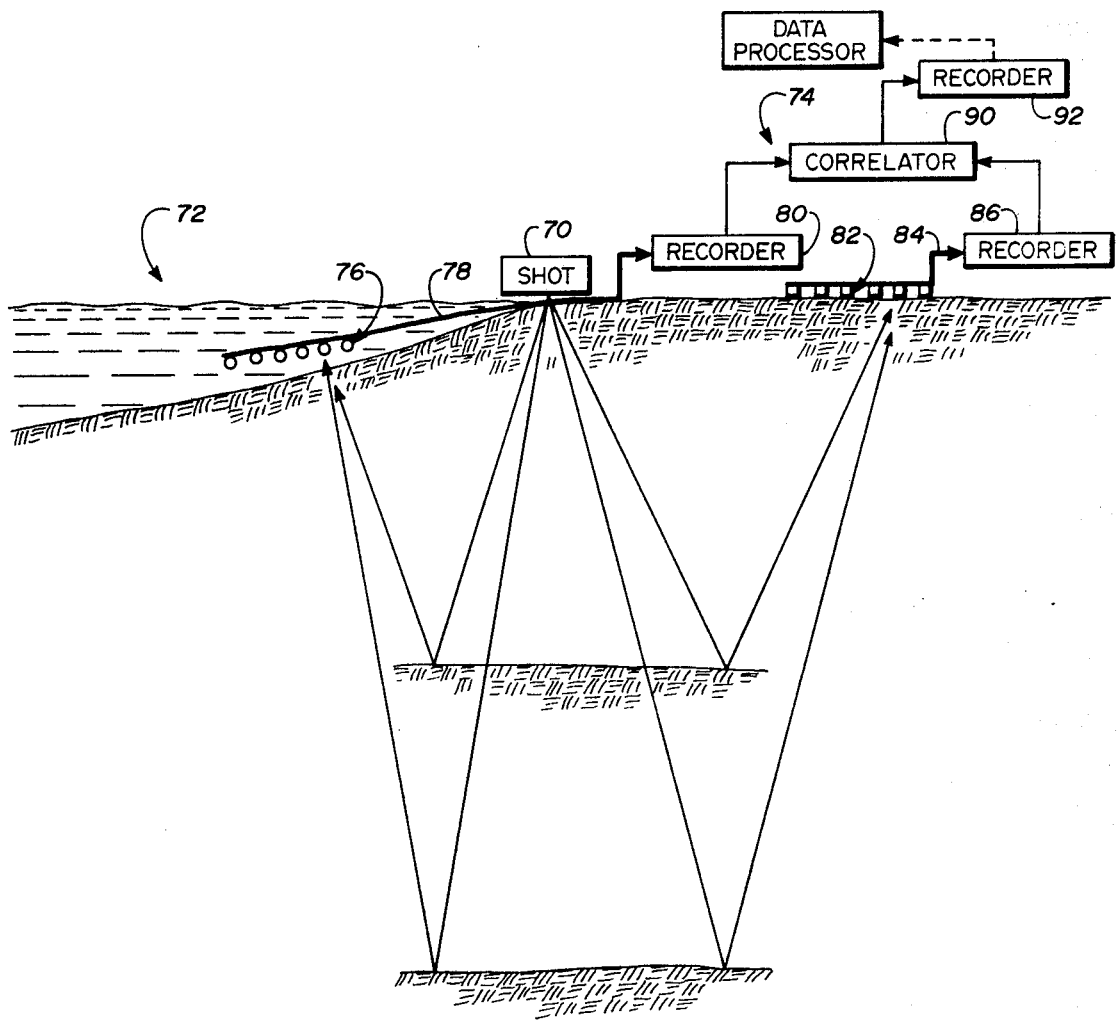
FIG. 3 is a block diagram of a system for determining the optimum phase shift function according to the invention.

The present invention utilizes a cross-correlation function derived in a manner shown in FIG. 3 for correction of the phase shifts illustrated in FIG. 4a. Referring to FIG. 3, a test operation is conducted by detonation of a dynamite shot 70 or other suitable source of seismic wave, between the shallow water 72 and the shore area 74. One or more pressure sensitive geophones 76 are disposed in the water for detection of pressure variations caused by the source 70. Electrical output signals produced by the geophones 76 are transmitted via a conventional seismic cable 78 and recorded on a conventional magnetic recorder 80. One or more velocity sensitive geophones 82 are also disposed in the shore area adjacent the source 70 for detection of seismic energy emanating from the source 70. Electrical output signals from the velocity geophones 82 are fed via a cable 84 to a conventional recorder 86. Due to the close proximity of the geophones 76 and 82 to the source 70, the seismic waves detected by the geophones correspond generally to the same subsurface reflecting strata. However, a phase shift will be introduced in the respective outputs of the two types of geophones due to the inherent difference in the geophones previously noted. It is important that the same type of pressure and velocity sensitive geophones be used in the test operation of FIG. 3 as are used in the actual exploration of FIG. 1.

The recorded seismic traces recorded on the recorders 80 and 86 may be composited into two optimum traces each representative of the output of one of the geophone arrays, or a single representative trace may be picked from each of the recorded traces on the recorders 80 and 86. The resulting two traces are fed to a correlator 90, with a resulting optimum time shift function being determined and recorded on a recorder 92. This function is applied to the data processor 26 shown in FIG. 1, and is utilized to optimumly phase shift the traces fed from recorder 24.

As is well known, correlation is a process for obtaining what may be called the average similarity between two functions or signals displaced relative to one another. The product of the values of the two functions at each point in time is taken through an interval on the time axis. These products are then added, and the sum divided by the time duration of the chosen interval. If two different functions $f(x)$ and $g(x)$ have a time displacement $\tau$ and are correlated over a finite time interval $T_1$ to $T_2$, the cross-correlation process is described by the well-known function:

$$\rho(\tau) = \frac{1}{T_2 - T_1} \int_{T_1}^{T_2} f(t) g(t-\tau) dt \qquad (1)$$

Such correlation is well known and is described in a number of publications. For instance, the U.S. Pat. No. 3,075,607, issued on Jan. 29, 1963, to Aitken et al., and assigned to the present assignee, describes digital cross-correlation in detail. Further descriptions of typical cross-correlation techniques and systems may be found in Section 9.3 et seq. of *Introduction to Radar Systems* by Merrill I. Skolnik, published 1962 by McGraw-Hill in *Geophysics*, Vol. 33, No. 1 (Feb. 1968), p. 105–126, by Schneider et al.; and in the copending patent application, Ser. No. 604,434, filed Dec. 23, 1966, by James R. Brey, and assigned to the present assignee now U.S. Pat. No. 3,417,370. Another example of cross-correlation by a digital computer is disclosed in the copending patent application, Ser. No. 550,314, entitled "Space Averaged Dynamic Correlation Analysis," by Backus et al. now U.S. Pat. No. 3,571,788.

In practice, such cross-correlation is advantageously carried out in a properly programmed digital computer after suitable nonlinear gain compensation and corrections for normal moveout have been made to the traces. Each trace is typically divided into 24 contiguous segments averaging about 200 ms. long. Each segment is cross-correlated with the other trace segment from the same time interval.

After the cross-correlation is accomplished, a phase angle $\Phi$ will be determined at which the cross-correlation function attains its maximum positive value nearest $\tau=0$. Thus, when $\tau=\Phi/2\pi f$, the maximum cross-correlation function is attained. The value $\Phi/2\pi f$ thus corresponds to the time required to shift $g(x)$ such that it is in phase with $f(x)$. In the present invention, this time shift value is utilized to shift the velocity traces relative to the pressure traces.

In some cases, it may be desirable to scale the amplitude of the velocity traces to correspond with the amplitude of the pressure traces. This may be accomplished by autocorrelation techniques, and by setting the value of the autocorrelation at $\tau=0$. This determines the relative amplitude factors of the pressure and velocity traces. This basic amplitude scaling technique, in addition to the phase shift determination technique previously described, is conventional and is described fully in a number of publications including the copending patent application, Ser. No. 356,777, filed Apr. 2, 1964, by Lawrence M. Godfrey et al., and assigned to the present assignee. The determined optimum time shift function is recorded from the correlator 74 on the recorder 92 and fed into the data processor 26. The function is then applied by the digital computer, such as a TIAC computer, to all of the traces from one of the geophone arrays. If the test trace from the velocity sensitive geophone is taken as a reference in the cross-correlation function, then the optimum time shift function is applied to all of the traces from the pressure sensitive geophones. Conversely, if the output trace from the pressure sensitive geophone array 76 is taken as the reference trace in the cross-correlation operations, then the optimum time shift function determined by the correlator 74 is applied to each of the output traces from the velocity sensitive geophone arrays.

After determining the optimum time shift function to properly phase align the pressure and velocity waves of the invention, the traces recorded in recorder 24 must be phase shifted according to the time shift function. This is preferably accomplished with the use of properly designed digital filters within the data processor 26. Due to the variance of phase of the pressure and velocity waves with respect to frequency, these digital filters are designed in the frequency domain according to the cross-correlation data previously obtained, and then applied to the desired traces in the time domain. The design of suitable digital filters to accomplish the desired phase shifts is well within the skill of one or ordinary skill in the art, and will not be described in detail. For instance, the design of digital filters is disclosed in U.S. Pat. No. 3,284,763 issued to Burg et al. on Nov. 8, 1966; in *Geophysics*, Vol. XXXII, No. 6, (Dec. 1967), p. 988–1002, by Silverman; and in *Geophysics*, Vol. XXIX, No. 3 (June 1964), p. 395–404, by Robinson et al.

Alternatively, the time shifting of the records may be accomplished by mechanical seismic record shifters such as the type described in the copending patent application, Ser. No. 630,463, to Embree et al. entitled "Method and System for Seismic Record Alignment," or in the copending patent application, Ser. No. 356,777, filed Apr. 2, 1964, by Godfrey et al. While digital cross-correlation has been described with respect to the preferred embodiment of the invention, it will be understood that analog cross-correlation may also be conducted according to the invention in the manner described in U.S. Pat. No. 3,313,375, issued to Watson, U.S. Pat. No. 2,794,965 issued to Yost, or in the article entitled "An Analog Seismic Correlator" by Tullos et al. in *Geophysics*, Vol. XXVI, No. 3.

Figure 4B:
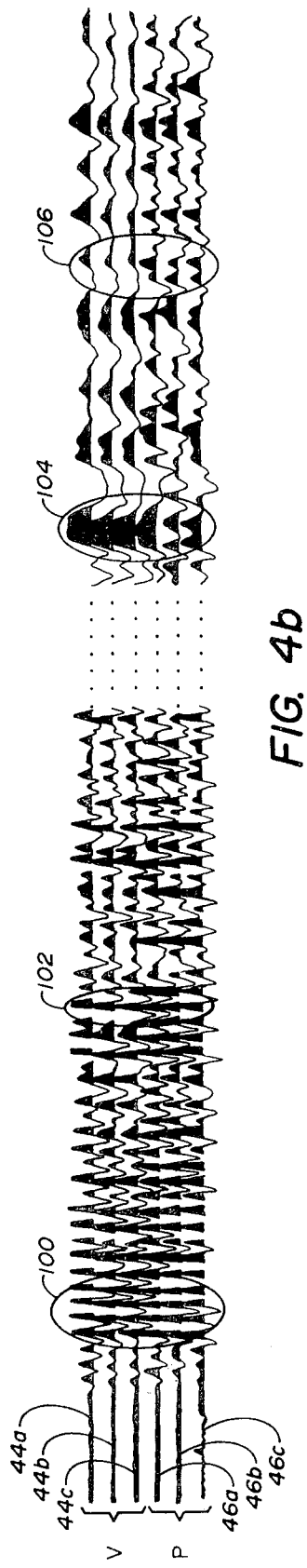
FIG. 4b is the seismogram of FIG. 4a after being phase shifted into phase alignment according to the invention.

After the application of the phase shift between the pressure responsive and velocity responsive seismic traces, corresponding record portions will be generally aligned in the manner shown in FIG. 4b. For instance, the peaks of the analog seismogram in the area 100 are now generally aligned to provide meaningful seismic information, unlike the phase shifted data previously contained in the areas 48 and 50 as shown in FIG. 4a. In a similar manner, the data contained in area 102 has been shifted to become aligned, unlike the time shifted data previously contained in the areas 52 and 54. In like manner, the data contained in the deeper reflection areas of 104 and 106 are now aligned according to the invention to provide seismic data for more meaningful data than that previously contained in the unaligned corresponding portions 56–62 shown in FIG. 4a.

Normally, digital filters will be designed to phase shift the velocity traces with respect to the pressure traces. However, if desired, the inverse of the digital filters may be applied in order to phase shift the pressure traces with respect to the velocity traces.

Figure 5:
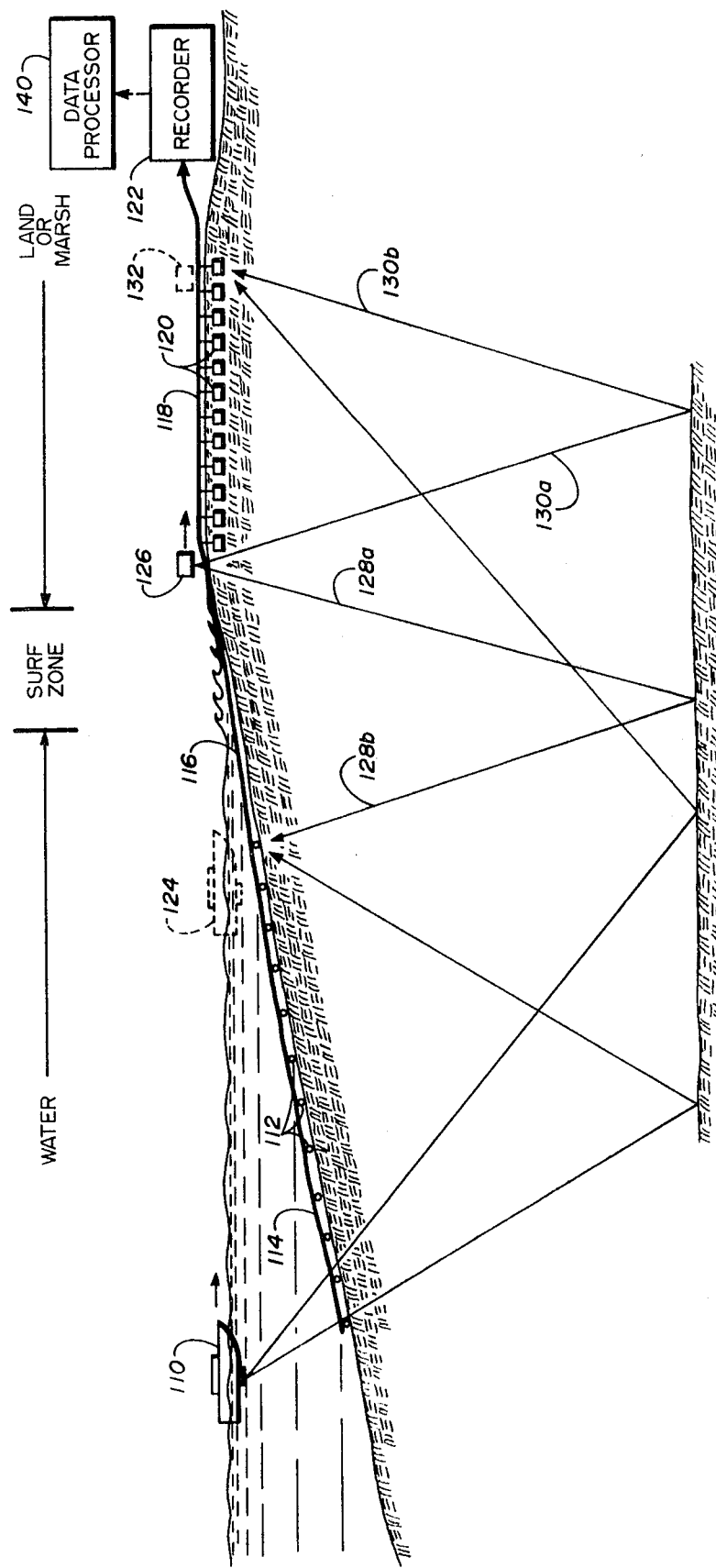
FIG. 5 is a somewhat diagrammatic representation of seismic exploration according to the invention in an area of heavy surf.

Exploration according to the invention may also be advantageously carried out in the areas wherein rough surf is present. Such exploration is illustrated in FIG. 5, wherein a marine vessel 110 initially generates seismic waves at an in-line offset position from a first array of pressure sensitive geophones 112. The geophones 112 are connected at spaced intervals along a light bay cable 114, the end of which is connected to a jumper cable 116. The jumper cable 116 extends through the surf zone to the land or marsh zone, whereupon the cable 116 is connected to a seismometer cable 118. A plurality of velocity responsive geophones 120 are connected along the cable 118 in the manner previously described. For instance, the velocity sensitive geophones 120 are preferably pushed downwardly into the marsh area for better seismic reception. The outputs of the pressure sensitive geophones and of the velocity sensitive geophones 120 are fed to a conventional magnetic recorder 122.

It will be seen that this embodiment is similar to the embodiment shown in FIG. 1, with the exception of the connection of the jumper cable 116 between the pressure sensitive and the velocity sensitive geophone arrays. The jumper cable 116 is similar to the light bay cable previously described, except that the molded leadins are eliminated. In a typical embodiment, the jumper cable may have a length of up to 3,000 feet, with the geophone arrays being connected at intervals approximating those previously described. With the use of this jumper cable 116, seismic data may be obtained underneath the noisy surf zone without the problems usually attendant, as the pressure sensitive geophones 112 and the velocity sensitive geophones 120 are spaced far enough apart from the surf zone to eliminate noise problems. In the embodiment shown, 12 geophone arrays 112 have been illustrated for use in conjunction with 12 velocity sensitive geophone arrays 120. Operation of the seismic sources with a cable 116 of a length of 3,000 feet, in the manner to be described, will provide threefold coverage of the area beneath the surf zone.

In operation of the system, the marine vessel 110 initially generates seismic disturbances at the illustrated offset location. The vessel 110 may generate disturbances with air guns, dynamite or the like. The seismic waves are reflected by underground strata and detected by each of the geophones 112 and 120. The electrical outputs of the geophones are recorded on the recorder 122. The marine vessel 110 then moves to an offset position above the next geophone 112 and additional seismic disturbances are generated. Additional seismic disturbances are then sequentially generated until the marine vessel reaches the location 124 which is offset from the pressure sensitive geophone 112 closest to the surf zone. The seismic disturbances generated at location 124 are again received by each of the geophones 112 and 120.

An important aspect of the invention is the continuation of seismic disturbance generation by a land or marsh based apparatus 126. Apparatus 126 initially generates disturbances at the illustrated in-line offset position, the disturbances being detected by the pressure geophones 112, as evidenced by the waves traveling the raypath 130a–b. The land or marsh based apparatus 126 is then moved to an offset position adjacent the next velocity sensitive geophone 120 and generates additional seismic disturbances. This sequential operation of apparatus 126 is continued over each of the velocity sensitive geophones 120 until the final offset location 132 is reached.

The marsh or land-based seismic generation apparatus 126 may comprise any one of a number of conventional generators. For instance, the apparatus may comprise the conventional weight dropping apparatus technique as described in U.S. Pat. No. 2,851,121 issued to McCollum. Alternatively, the system 126 may comprise the conventional dynamite shot generation technique. For marshy or wet sandy shore areas, air gun sources mounted on amphibious-type vehicles may be utilized advantageously. Additionally, barge-mounted air gun arrays which may be mechanically pushed into a marsh by hydraulic means may be advantageously utilized. Such barge-mounted air gun arrays are currently being utilized by Texas Instruments Incorporated of Dallas, Texas, and a disclosure thereof may be found in the paper entitled "A Pneumatic Seismic Energy Source For Shallow-Water/Marsh Areas," by Brede et al., published May 21, 1969, by the Offshore Technology Conference, Houston, Texas.

After seismic traces have been recorded according to the operation shown in FIG. 5, the traces from the velocity sensitive geophones 120 are phase shifted relative to the traces received from the pressure sensitive geophones 112 within the data processor 140. This phase shifting is accomplished in the manner previously described wherein the optimum time shift function obtained from cross-correlation is utilized in a digital computer as a basis for the shifting of the two sets of signals. After phase shifting of the signals, additional digital processing in the conventional manner is performed on the traces and the traces are converted to analog signals and recorded in the manner show in FIG. 4b.

Whereas the present invention has been described with respect to a specific embodiment thereof, it is to be understood that various modifications and changes will become apparent to one skilled in the art, and it is intended to encompass those changes and modifications as fall within the scope of the appended claims.

What is claimed is:

1. A seismic exploration system comprising:
   a. means for generating seismic waves,
   b. a first array of seismic receivers located in water adjacent a shore area responsive to variations in a first physical characteristic created by said seismic waves,
   c. a second array of seismic receivers located on the shore area responsive to variations in a second physical characteristic created by said seismic waves, and
   d. means for shifting the phases of the output signals relative to each other of said first and second arrays of seismic receivers into alignment.

2. The system of claim 1 wherein said first array comprises pressure geophones and said second array comprises velocity geophones.

3. The system of claim 1 wherein said first and second arrays are separated by a surf area, said arrays being connected by a length of jumper cable extending through the surf area.

4. The system of claim 1 and further comprising:
   means for shifting the phases of the output signals of said first and second arrays according to a predetermined time interval function.

5. The system of claim 4 and further comprising:
   means for generating seismic waves at a location between an array of seismic receivers responsive to variations in pressure and between a second array of seismic receivers responsive to velocity variations, and
   means for cross-correlating the output signals generated by said first and second arrays to determine said time interval function.

6. The system of claim 1 and further comprising:
   means for generating seismic waves at locations in the water adjacent the shore area.

7. The system of claim 6 and further comprising:
   means for generating seismic waves at locations on the shore area.

8. A system for seismic exploration of a shore area comprising:
   a. means for generating seismic waves in the vicinity of the shore area,
   b. test pressure sensitive seismic receivers disposed in water adjacent the shore area for generating electrical signals in response to the seismic waves,
   c. test velocity sensitive seismic receivers disposed on the shore area for generating electrical signals representative of the seismic waves, d. means for cross-correlating the electrical signals from said test receivers for generation of an optimum time shift function,
e. means for generating sequential seismic disturbances at spaced-apart locations in the vicinity of the shore area,
f. a field array of pressure sensitive seismic receivers disposed in the water adjacent the shore area,
g. a field array of velocity sensitive seismic receivers disposed on the shore area,
h. means for recording the electrical outputs of said field arrays, and
i. means for phase shifting said electrical outputs relative to one another in accordance with said optimum time shift function.

9. The system of claim 8 wherein said field arrays are separated by a surf area.

10. The system of claim 9 wherein said means for generating seismic disturbances at spaced-apart locations comprises:
a seismic wave generator source located on a marine vessel.

11. The system of claim 9 wherein said means for generating seismic disturbances at spaced-apart locations comprises:
a seismic wave generator disposed on a vehicle movable over land.

12. A method of seismic exploration comprising:
a. generating seismic waves,
b. generating first electrical signals in response to variations in pressure created by the generation of said seismic waves,
c. generating second electrical signals in response to velocity dependent variations created by said seismic waves, and
d. shifting the phases of said first and second electrical signals relative to one another in response to an optimum time shift function to provide a coherent seismic record wherein said optimum time shift function is determined by
generating test seismic waves,
generating first test electrical signals in response to variations in pressure created by the test seismic waves,
generating second test electrical signals in response to variations created by said test seismic waves, and
cross-correlating said first and second test electrical signals for generation of said optimum test shift function.

13. A method of seismic exploration in a shore area comprising:
a. generating a sequence of seismic waves,
b. generating first electrical signals in response to pressure variations created by the generation of said seismic waves in the water adjacent the shore area,
c. generating second electrical signals in response to velocity variations caused by said seismic waves in the shore area, and
d. time shifting said first and second electrical signals into phase alignment.

14. The method of claim 13 wherein said first and second electrical signals are generated at locations separated by a surf area.

15. The method of claim 13 wherein said first and second electrical signals are shifted by a time interval which varies in accordance with the depth from which the seismic waves emanate.

16. The method of claim 13 wherein said first and second electrical signals are time shifted in accordance with a predetermined optimum time shift function.

17. The method of claim 16 wherein said predetermined optimum time shift function is determined by detecting pressure variations created by the generation of a test seismic wave,
detecting velocity variations caused by said test seismic wave, and
cross-correlating electrical signals generated in response to said pressure and velocity variations for generation of a varying optimum time shift function.

18. The method of seismic exploration in a shore area comprising:
generating seismic impulses at spaced points along a linear traverse in the shallow water adjacent the shore,
detecting pressure variations in the water adjacent the shore area which are created by said seismic impulses,
detecting velocity variations at locations on the shore area created by said seismic impulses,
recording electrical signals generated in response to the detection of said pressure and velocity variations, and
shifting the phases of said electrical signals relative to one another in dependence upon an optimum time shift function determined by cross-correlating the outputs of similar pressure variation and velocity variation sensitive receivers.

* * * * *